United States Patent [19]
Geerts

[11] Patent Number: 5,088,589
[45] Date of Patent: Feb. 18, 1992

[54] CONVEYOR SYSTEM, CONVEYOR OR BUFFER AND DISTRIBUTION SYSTEM, AND PROCESS FOR TRANSFORMING A GOODS FLOW

[76] Inventor: Johannes G. C. Geerts, Westerduinweg 32, 2116 VH Bentveld, Netherlands

[21] Appl. No.: 569,732

[22] Filed: Aug. 21, 1990

Related U.S. Application Data

[63] Continuation of Ser. No. 506,559, Apr. 9, 1990, abandoned, which is a continuation of Ser. No. 300,906, Jan. 24, 1989, abandoned.

[30] Foreign Application Priority Data

Feb. 4, 1988 [NL] Netherlands ................. 8800265

[51] Int. Cl.$^5$ ............................. B65G 47/26
[52] U.S. Cl. .................. 198/457; 198/465.3; 198/465.4; 198/607; 198/803.2; 198/681
[58] Field of Search ......... 198/465.3, 465.4, 803.2, 198/681, 703, 370, 457, 798, 603, 607

[56] References Cited

U.S. PATENT DOCUMENTS

| | | | |
|---|---|---|---|
| 1,837,605 | 12/1931 | Baker | 198/465.3 |
| 2,318,180 | 5/1943 | Morse | |
| 2,897,772 | 8/1959 | Hunter | 198/465.3 X |
| 3,587,819 | 7/1971 | Deakon et al. | 198/465.3 |
| 3,993,189 | 11/1976 | Khoylian et al. | 198/465.3 X |
| 4,164,391 | 8/1979 | Howard et al. | 198/465.3 X |
| 4,232,779 | 11/1980 | Khoylian et al. | 198/465.3 |
| 4,303,503 | 12/1981 | de Mimerand et al. | 198/465.4 X |
| 4,722,433 | 2/1988 | Gough | 198/712 X |

FOREIGN PATENT DOCUMENTS

| | | | |
|---|---|---|---|
| 0986449 | 3/1976 | Canada | 198/465.4 |
| 0093863 | 11/1983 | European Pat. Off. | |
| 0212858 | 3/1987 | European Pat. Off. | |
| 3538674 | 5/1987 | Fed. Rep. of Germany | |
| 7305636 | 10/1974 | Netherlands | |
| 7500634 | 1/1975 | Netherlands | |
| 0540780 | 12/1976 | U.S.S.R. | 198/465.4 |
| 0897475 | 1/1982 | U.S.S.R. | 198/465.4 |

OTHER PUBLICATIONS

Patent Abstracts of Japan, vol. 7, No. 74 (M-203) (1219), 26 Mar. 1983; & JP-A-58 2105 (Shinkawa K.K.) 07-01-1983.

Primary Examiner—D. Glenn Dayoan
Attorney, Agent, or Firm—Lalos & Keegan

[57] ABSTRACT

A conveyor system for pivotally suspended carrier containers travelling through a closed path composed of interconnected straight portions each lying at a right angle to the previous and to the next portion. The subsequent portions of the path through which travel the carrier containers are each composed of a sub-conveyor comprising two parallel straight flights interconnected by 180° bends. The suspension system of the containers together with a guiding rail render it possible for each container to pass from one sub-conveyor to the next one at a right angle crossing point.

6 Claims, 3 Drawing Sheets

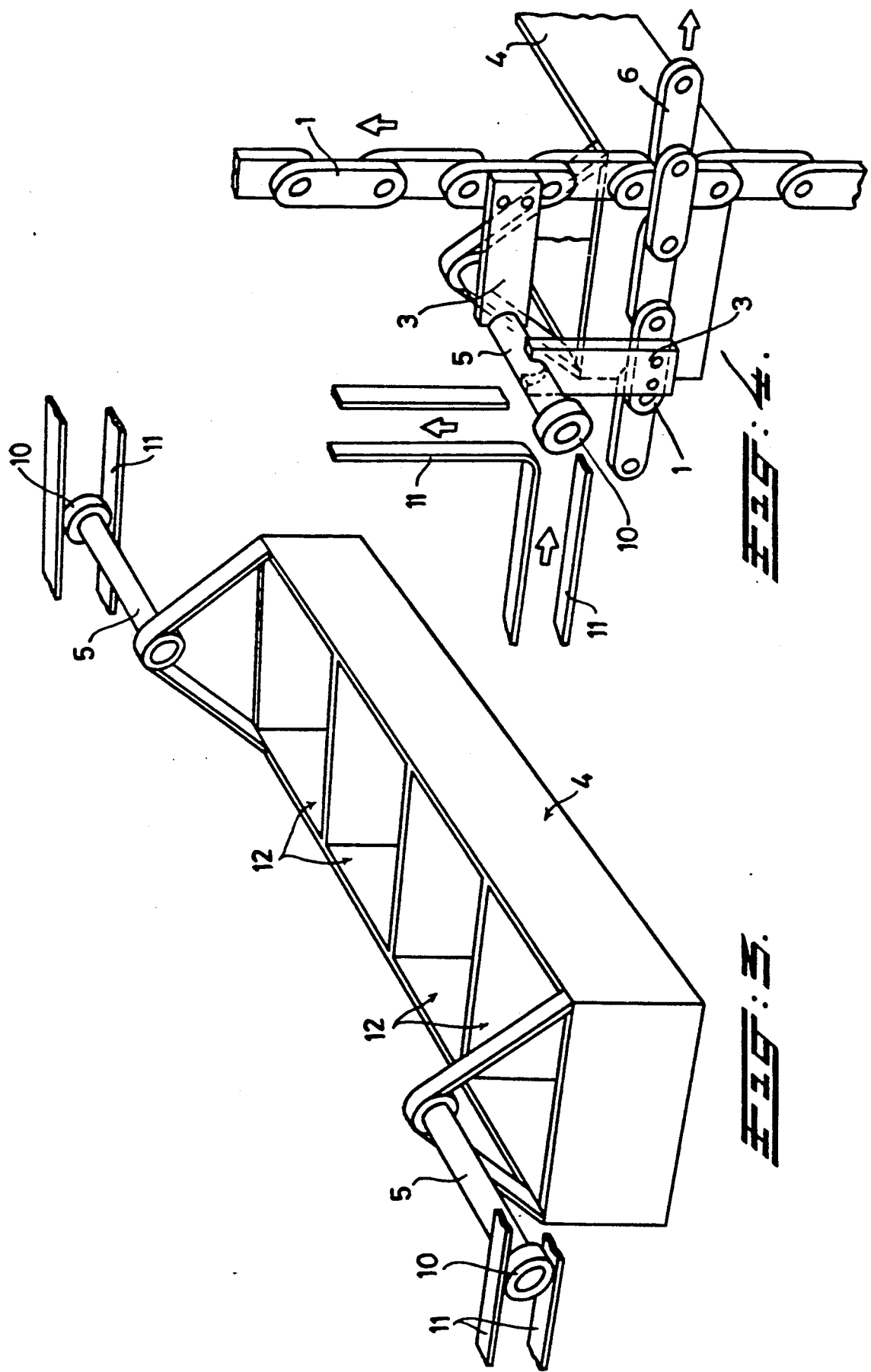

CONVEYOR SYSTEM, CONVEYOR OR BUFFER AND DISTRIBUTION SYSTEM, AND PROCESS FOR TRANSFORMING A GOODS FLOW

This is a continuation of copending application Ser. No. 506,559, filed on Apr. 9, 1990, now abandoned, which is a continuation of Ser. No. 07/300,906, filed on Jan. 24, 1989, now abandoned.

FIELD OF THE INVENTION

This invention relates to a conveyor system, made up of a number of driven pulling or pushing elements or an endless conveyor, provided with carrying members fitted at regular intervals, also made up of carrier containers with suspension points which together with said members permit a hanging support of the carrier containers, said pulling or pushing elements traversing a closed route and thus forming a conveyor, the route of which consists of straight parts situated essentially in parallel planes and partly running at right angles to each other, these route parts being connected to each other by both lefthand and righthand bend. A problem with such a conveyor system known from European Patent 0,212,858 GOUGH is the required space, since there must be sufficient play between adjacent carriers to permit the taking of each bend of the route without problems.

BACKGROUND OF THE INVENTION

Attempts have already been made to increase the compactness of the conveyor system by using sidewardly extending arms as the above-mentioned carrying members with which the carriers are suspended from the pulling or pushing elements. While the use of arms increases the compactness of the unit, it means a limitation due to the fact that it is only possible to take bends in which the arms are directed radially outwards. In a bend with opposite radius of curvature the arms are directed radially inwards, which inevitably leads to touching, particularly if the aim is to achieve any compactness.

SUMMARY OF THE INVENTION

It is the object of this invention to produce a conveyor system which permits great compactness while maintaining full freedom as regards the shape of the route to be taken. This object is achieved according to my invention through the combination of the following features:

1) The conveyor system is divided into as many sub-conveyors as there are route parts running at right angles to each other, said sub-conveyors directly contacting each other, in which each sub-conveyor is following a closed route comprising two parallel straight parts and two connecting 180° bends, whereby at the location of a right angle transition between a first and a second sub-conveyor, the concerning carrying member of the said second sub-conveyor takes over the supplied carrier container from a carrying member belonging to said first sub-conveyor, 2) Each suspension point of each carrier container is provided with a slide or roller element which is guided in supporting fashion in a rail forming a path corresponding to the closed route of the conveyor system.

3) Each carrying member is disposed on a pulling or pushing element and is of a form which permits a detachable coupling with a suspension point of a carrier container.

The term "at right angles" in this connection is understood to mean an angle which can be 90°, but which can also deviate max. ±45° therefrom. In other words, the sub-conveyors can cross each other at an angle ranging from approximately 45° to 135°.

Through the combination of the above-mentioned measures, in a transition from one straight part of the route to a part of the route at right angles thereto, the carriers leave one carrying member and are taken over at the same time by another member belonging to a following sub-conveyor. This is repeated as often as a change of direction occurs. The sub-conveyors always pass through the same type of bend (lefthand or righthand), so that no problems can occur with the arms.

It is observed that U.S. Pat. No. 1,837,605 BAKER discloses a conveying system composed of a number of endless conveyors, each separated from the preceding as well as from the next conveyor by an inclined track portion. Consequently the carrier buckets of this known system do not circulate in a closed path, but in a composite track alternatively comprising a mechanical conveyor and a sloping rail in which the forward movement of each bucket is caused by gravity.

The invention relates in particular to a conveyor system in which at least two parallel-running conveyors situated at some distance apart are present, between which the carrier containers are suspended and advance along the closed route. According to the invention, the carrier containers are accessible from the top and above at least part of the horizontal sub-conveyors there is at least one load discharge element for depositing a load (e.g. an article) in a carrier container of this sub-conveyor, while provision is made at at least one point of the route for an unloading station for discharge of the load (e.g. articles) carried by a passing carrier container.

A conveyor system designed in this way can operate as a buffer and distribution system through the fact that carrier containers moving in a closed route can selectively pick up a load such as one or more articles and can convey or buffer it within a compact space for just as long as is necessary for picking up all further desired articles, following which the completed content of the carrier container can be discharged in an unloading station.

In such a conveyor or buffer and distribution system the load discharge elements preferably form part of at least one computer-controlled unit provided with a driven endless conveyor, the route of which is (generally, but not necessarily) stepwise completed, is perpendicular to the parallel planes in which the conveyor system for carrier containers moves. This produces a system operating in three-dimensions with an undifferentiated supply of articles at one side and discharge at an unloading station at the other side with the articles being delivered in a selected arrangement.

Another aspect of the invention is embodied in a process for transformation of a flow of goods from an undifferentiated supply to a discharge in a selected arrangement, using a combined conveyor and distribution system. This process is characterized according to the invention in that:

use is made of at least one conveyor system, in which carrier containers pass along a closed route and in doing so pass through at least one loading and one unloading station, and use is also made of a number of discharge elements, in which the goods flow is formed by different types of articles;

each article is given a code, relating to the envisaged selected composition of the discharge in an unloading station;

each coded article is conveyed to a delivery element and from there in a standstill period is transferred from said delivery element to a carrier container which is standing still at that moment;

each carrier container of the conveyor system is programmed to receive selected articles from the discharge elements and to buffer within the conveyor system the articles thus gradually received; and after all preselected articles have been picked up, each carrier container delivers the total load to the designated station while passing said station.

DESCRIPTION OF THE DRAWINGS

The invention will be explained in greater detail with reference to the drawing, which shows a number of variants of the conveyor system and the system to be built thereon, while a number of details are also illustrated.

FIG. 3 is a perspective view on an enlarged scale of a carrier container from the conveyor system according to the previous figures.

FIG. 4 shows, also in perspective and on an enlarged scale, an embodiment of the carrying members, in particular the arms working in concert with the suspension points of the carrier container.

DESCRIPTION OF PREFERRED EMBODIMENTS

Figure 1:
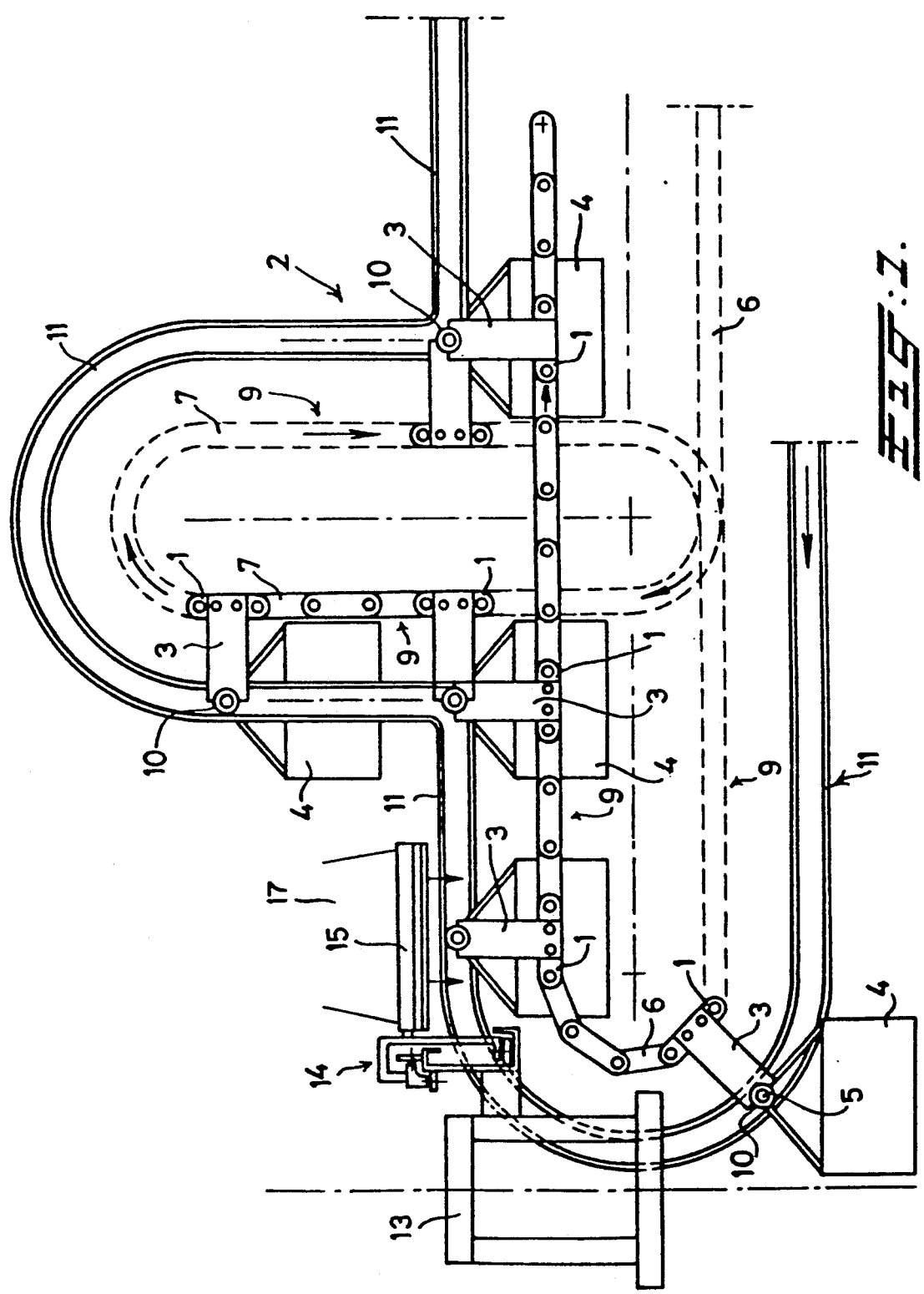
FIG. 1 shows the principle of a right-angled transfer of a carrier container from one sub-conveyor to another, the conveyor system being shown on a slightly enlarged scale compared with FIG. 2.
Figure 2:
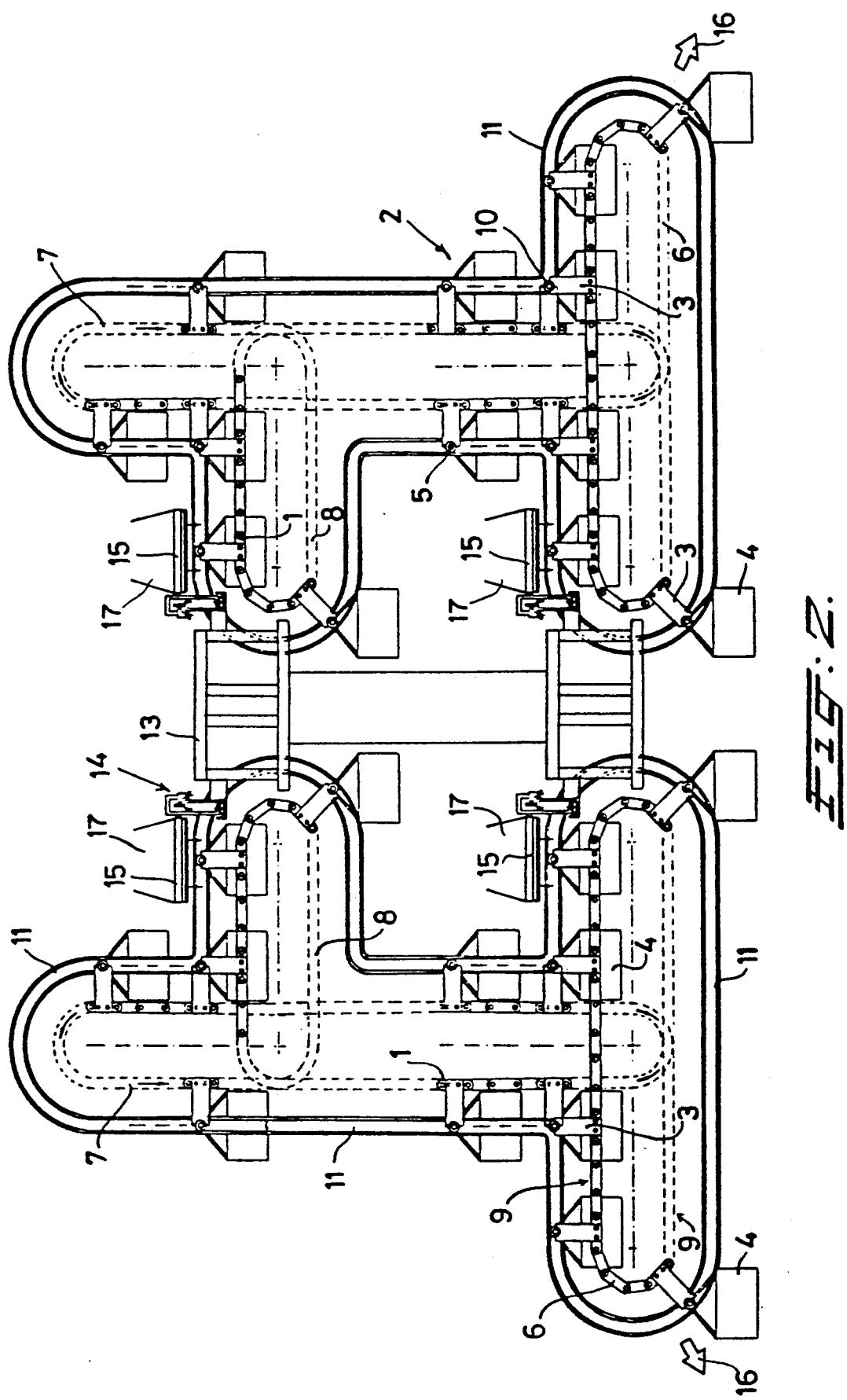
FIG. 2 is a side view of a conveyor or buffer and distribution system in a multiple embodiment, on a slightly smaller scale than in FIG. 1.

The FIGS. 1 and 2 show a conveyor system made up of a number of driven pulling or pushing elements 1 together forming a conveyor 2. These elements 1 are provided with carrying members, such as arms 3 disposed at regular intervals (see FIG. 4). The conveyor system is also made up of carrier containers 4 (see FIG. 3) which are accessible from above and in this case are open. These carrier containers are oblong in shape and at both ends are provided with a suspension point 5, formed by a projecting shaft end. These suspension points 5 together with the arms 3 permit a hanging support of the carrier containers 4. The pulling or pushing elements 1 run through closed routes and thus form the conveyor 2 whose route consists of straight parts which are essentially situated in parallel planes, and some of which stand at right angles to each other. These route parts are connected to each other by both lefthand and righthand bends. Up to this point the conveyor system described corresponds to known units, e.g. in the food industry. Here the carrier containers are filled with articles such as foodstuffs packed in jars or cans, which are conveyed to undergo, for example, heat treatment.

According to the invention, the conveyor system is not formed by a single conveyor, but is divided into as many sub-conveyors 6-8 as there are route parts at right angles to each other. In the selected embodiment according to FIG. 1 there is a horizontal sub-conveyor 6 and a vertical sub-conveyor 7. Each of these sub-conveyors comprises two parallel straight parts 9 and two connecting 180° bends. In the embodiment according to FIG. 2 there are also a number of shorter sub-conveyors 8 projecting horizontally sideways, with a particular object which will be explained later.

The conveyor system according to the invention is also novel in that each suspension point 5 of each carrier container 4 is provided with a slide or roller element 10 which is conveyed in supporting fashion in a rail 11 which forms a track corresponding to the closed route of the conveyor system. It can also be see from FIG. 4 that each arm 3 provided on a pulling or pushing element 1 is open in a forked shape and at the end in order to permit a detachable coupling with a suspension point 5 of a carrier container 4.

The conveyor system according to the invention will generally have at least two conveyors 2 running parallel some distance away from each other, between which the carrier containers 4 are suspended and move along the closed route. FIG. 3 shows an embodiment with two conveyors 2 and therefore also two rails 11. The carrier container 4 illustrated in this figure is divided into a number of compartments 12 with an object which will also be explained below. The carrier containers 4 travel stepwise, in order to permit transfer from one sub-conveyor to the other. This transfer is facilitated by the use of the rails 11 and the guidance of the roller elements 10 thereby produced.

The division of the conveyor system into sub-conveyors has the major advantage that the bends of each sub-conveyor always turn in the same direction, i.e. to the right in the embodiment shown. This means that the arms 3 can always operate in the optimum manner and achieve a very compact conveyor system in which maximum use is made of the available space. The conveyor system according to the invention also has possibilities for extension, by means of which any desired residence time of the carrier containers in the conveyor system can be achieved. This is the buffer function of this system, which represents an important new feature of the invention.

The sub-conveyors used are situated in planes which are parallel to each other and lie a short distance away from each other (see FIG. 4). An important object of the conveyor system according to the invention is to create a buffer, i.e. bring about a long route for each carrier container within a space which can be kept as small as possible.

FIG. 2 shows an important application for the conveyor system according to the invention, i.e. combined with one or more computer-controlled discharge units of the type described e.g. in Patent Application NL 73 05636. FIG. 2 shows a central frame 13 in which a load discharge unit 14 is provided at different levels. FIG. 2 shows two of such units which are designed with load discharge elements 15. These elements are located above a particular part of the horizontal sub-conveyors 6 and 8. Each of the above-mentioned units 14 is provided with a driven endless conveyor 17 (see, e.g. NL 73 05636) whose stepwise completed route is perpendicular to the parallel planes in which the conveyor systems for the carrier containers 4 shown in FIG. 2 move.

The elements 15 can deposit a load (e.g. an article) in (a compartment 12 of) a carrier container 4, at least if the precoding of the load and the carrier container concerned tally. The sub-conveyors 8 used in the unit according to FIG. 2 are directed horizontally sideways relative to the vertical sub-conveyor 7. The main object of these sub-conveyors 8 is to provide a horizontal route part for picking up a load from an element 15 of the unit 14. Finally, FIG. 2 also shows that an unloading station 16 is provided in the route of each conveyor 2, for discharging the load or articles carried by a passing carrier container 4.

In the embodiment according to FIG. 2 two conveyor systems for the carrier containers 4 are arranged on either side of the frame 13 in such a way that the load discharge elements 15 from each unit 14 can work in concert with a horizontal partial route of these conveyor systems, in order to permit transfer of a coded load from an element 15 to a selected carrier container 4. These elements 15 form a loading station for the conveyor 2.

FIG. 2 shows a conveyor or buffer and distribution system which can be used, e.g., for a mail order company which has a large number (e.g. thousands) of different articles in stock and receives orders by post or in some other way for delivery of certain numbers of selected articles. The entire selection process can be automated using conventional programming of one or more computers, the carrier containers 4 continuing to circulate in the conveyor system (which acts as a buffer) until the container 4—or a number of compartments 12 thereof—contains the whole order and the load in the station 16 can be discharged for subsequent packing and despatch.

In the above description there is constant mention of stepwise movement of the carrier containers 4. This is important only at the points where the sub-conveyors 6-8 cross each other. It is therefore conceivable for the conveyor 2 to be driven continuously and facilities which are known per se to be present at the above-mentioned crossing points for temporary stoppage of the containers 4, in order to facilitate the take-over from one arm 3 to the other.

It is also pointed out that only a single sub-conveyor 8 directed horizontally sideways is shown, but this number is not important. The vertical sub-conveyor 7 can be of such height that more than one sub-conveyor 8 running horizontally sideways can be provided, with a corresponding change in the path of the rails 11 involved.

The arms 3 are shown in the drawing as strips which are each fastened to a pulling or pushing element (chain link) 1 and at their free end are designed in a fork shape. Other embodiments are conceivable, and the possibility selected is therefore not meant to be limiting.

In the selected embodiment the arms are fixed to the chain links and the carrier container is detached from the arm during the transfer to the next sub-conveyor. Another possibility is to weld the arm to the carrier container so that it pivots, and to make the fastening of the chain links detachable. At the transfer points the arm after detaching from the chain link must be guided to and coupled to the appropriate chain link of the next sub-conveyor disposed at right angles to the first sub-conveyor.

What is claimed is:

1. A conveyor system for receiving, transporting, buffering and discharging loads, said system comprising a plurality of cooperating endless conveyors, each conveyor provided with carrying members for carrying containers, said containers including suspension members for coupling to said carrying members, said conveyors with containers traversing a closed route, said closed route including a series of subsequent route portions running at angles to each other, with each of said conveyors traversing one of said subsequent route portions and wherein each route portion meets another route portion at a transition location, said conveyor system including a rail forming said route portions, each suspension member of each said container including an element being supported and guided in said rail while said container traverses said route, each carrying member of each conveyor being detachably coupled to a suspension member of a container, and each suspension member of a container providing positive simultaneous contact with a carrying member of two of said conveyors when said container reaches a transition location between route portions of said two conveyors, whereby a container traversing said route is detached from one conveyor toward the end of one route portion and taken over by a conveyor traversing a subsequent route portion as said container moves from said one route portion to said subsequent route portion while traversing said route.

2. A conveyor system according to claim 1 comprising at least one additional closed route, an additional rail forming said additional closed route that is parallel to and spaced from the closed route, each additional closed route being substantially identical to said closed route, and an additional plurality of conveyors with carrying members, each container being simultaneously supported by a carrying member of each of said plurality of conveyors, said containers being accessible from the top, said additional routes including at least one horizontal route portion, the system further comprising a loading unit including a load discharge element for depositing a load into a container while a container is traversing said horizontal route portion, and an unloading station being provided on at least one point of at least one said closed route for emptying an accumulated load of a container.

3. A conveyor system according to claim 2 wherein said containers move in a first plane and said loading unit includes an endless conveyor which travels along a path perpendicular to said first plane in which said containers move.

4. A system according to claim 1 comprising at least two conveyor systems and further including a central frame located between a first and a second conveyor system and at least one load discharge element located on each side of said central frame to deposit a load into a container carried by said first and second conveyor systems.

5. A conveyor system according to claim 4 including a loading unit provided on said central frame at different levels.

6. A method for receiving, transporting, buffering and discharging loads comprising a series of cooperating, endless conveyors, each conveyor enclosing an angle with a preceding and with a subsequent conveyor of the series, said conveyors carrying containers along a closed route, the method including the steps of carrying said containers along said closed route while detachably coupled to one conveyor, providing positive simultaneous contact between a suspension member of a container and a carrying member of both said preceding and said subsequent conveyor when uncoupling, and uncoupling a container from said one conveyor by engaging said container with a subsequent conveyor, each container when traversing said closed route receiving a load discharged from at least one load discharge unit, and delivering said load to an unloading station once a complete load has been discharged into said container.

* * * * *